No. 638,116. Patented Nov. 28, 1899.
C. W. HERWICK & E. J. LONERGAN.
PRUNING IMPLEMENT.
(Application filed Dec. 14, 1898.)
(No Model.)
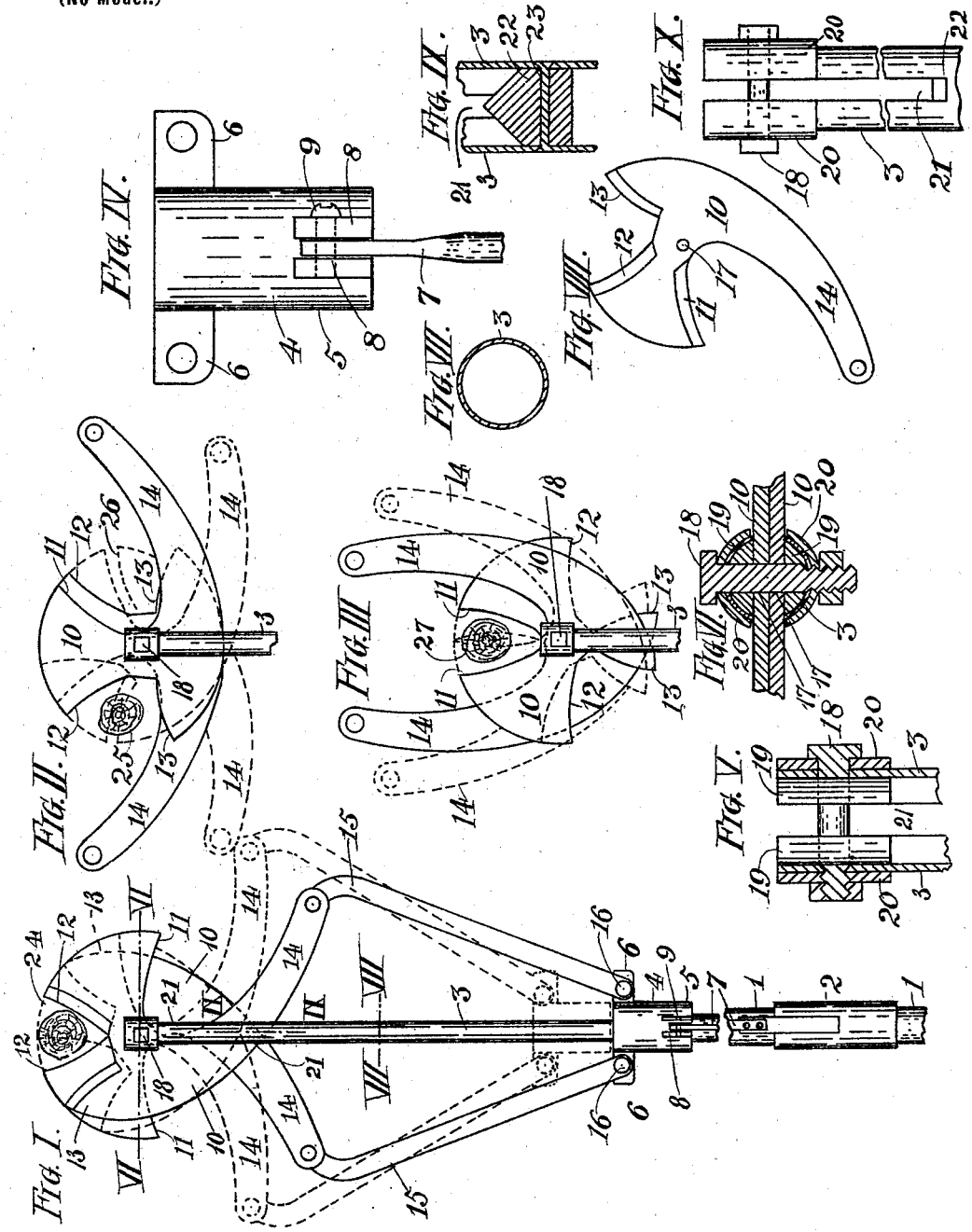

UNITED STATES PATENT OFFICE.

CHARLES W. HERWICK AND EDMOND J. LONERGAN, OF LOS ANGELES, CALIFORNIA; SAID HERWICK ASSIGNOR TO SAID LONERGAN.

PRUNING IMPLEMENT.

SPECIFICATION forming part of Letters Patent No. 638,116, dated November 28, 1899.

Application filed December 14, 1898. Serial No. 699,278. (No model.)

*To all whom it may concern:*

Be it known that we, CHARLES W. HERWICK and EDMOND J. LONERGAN, citizens of the United States, residing at Los Angeles, in the county of Los Angeles and State of California, have invented certain new and useful Improvements in Pruning Implements, of which the following is a full, clear, and exact description, reference being had to the accompanying drawings, which form a part of this specification.

Our invention relates to certain new and useful improvements in pruning implements intended more especially for pruning trees and other vegetation beyond the reach of a single-handed pruning implement; and our invention consists in certain features of novelty hereinafter described and claimed.

Figure I is a side elevation of our improved device, showing one position of the cutting-blades and the handle broken. Fig. II is a detail view showing another position of the cutting-blades. Fig. III is a detail side elevation showing still another position of the cutting-blades. Fig. IV is an enlarged detail view of the sliding head and rod for operating the blades. Fig. V is a detail side elevation of the bushings and a sectional view of the tubing at the pivotal point of the cutting-blades. Fig. VI is a transverse section taken on line VI VI, Fig. I. Fig. VII is a transverse section taken on line VII VII, Fig. I. Fig. VIII is a side elevation of one of the cutting-blades. Fig. IX is a longitudinal section taken on line IX IX, Fig. I. Fig. X is a detail side elevation of the tubing to which the blades are pivoted.

Referring to the drawings, 1 represents the handle, which is of sufficient length, whereby the upper branches of the ordinary fruit and shade trees or hedge may be reached by the cutting-blades.

2 represents an operating-sleeve, sliding freely on the handle 1, which may be grasped by the hand not holding the handle and forced lengthwise on the handle for the purpose of operating the cutting-blades.

3 represents a shaft or rod, preferably formed of hollow steel tubing, which gives strength and lightness to the instrument, the lower end of the tubing 3 being suitably secured to the upper end of the handle 1.

4 represents a head composed of a collar 5, adapted to reciprocate on the tubing 3 and having ears 6 at its upper end. The collar 5 is connected with the sleeve 2 by means of a rod 7, whereby the reciprocating of the sleeve 2 causes the collar 5 to travel in the same direction upon the tubing 3. The upper end of the rod 7 is pivoted to brackets 8 on the collar 5 by means of a pin or screw 9, said rod being easily detached from the collar if found desirable in repairing and sharpening the device.

10 represents the blades of our pruning implement, of which there are a pair and which are facsimiles. The blades 10 are each formed with a projection located at one side thereof and having two concave cutting-faces 11 and 12 and with a projection in line therewith and having a curved cutting-face 13.

14 represents arms which are an integral portion of the cutting-blades and through which leverage is applied to the blades. The arms 14 are pivoted at their lower ends to the upper ends of bars 15, the lower ends of said bars 15 being pivoted at 16 to the ears 6 of the sliding head 4. The blades 10 are provided with orifices 17 and are pivoted at the upper end of the tubing 3, 18 representing a bolt which extends through the orifices 17, through the tubing 3, and through a bushing 19, placed inside of the tubing in order to add strength to the pivotal point of the blades.

20 represents a collar formed in segments, through which the bolt 18 also passes to add to the strength of the tubing 3 where the blades are pivoted to the tubing.

21 represents a slot in the upper end of the tubing 3, in which the blades and arms 14 freely work.

22 represents a plug located in the tubing 3 at the lower end of the slot 21, which resists the shock of the arms 14 at the extreme downward thrust of said arms.

23 represents a bolt for holding the plug 22 in position in the tubing 3.

Owing to the multiplicity of cutting-faces on the blades, we produce four separate cutting-openings. The first cutting-opening, as shown at 24, (see Fig. I,) is formed by the cutting-faces 12 approaching each other. Then by an upward stroke of the sleeve 2 said faces are thrown into the position shown in dotted lines, (see Fig. I,) thus severing the object resting between said faces. The second and third cutting-openings are represented at 25 26, (see Fig. II,) at which time the cutting-faces 11 13 approach each other on each side of the tubing 3. The fourth cutting-opening (shown at 27, see Fig. III) is formed by the cutting-faces 11 approaching each other. In each of the views, Figs. I, II, and III, the blades are shown in position in full lines to perform the cutting, and their close proximity or cutting position is indicated by dotted lines.

The first cutting operation, as shown in Fig. I, is performed by an upward stroke of the sleeve 2. The second, third, and fourth cutting operations are performed by a downward stroke of the sleeve 2, thus affording a multiplicity of cutting-openings in which the leverage is increased or diminished according to the size of the limb or the amount of force to be exerted for the accomplishing of the work. The multiplicity of faces also affords an instrument whereby when one set of faces become dull or injured there are other sets which may be used by the operator.

We claim as our invention—

1. A pruning implement comprising a handle and a pair of blades having pivotal connection with the handle; each of the said blades being formed with a projection located in line therewith and having a cutting-face and with a projection located at one side thereof and having two cutting-faces; substantially as set forth.

2. A pruning implement comprising a handle, a sleeve loosely mounted on the handle, a pair of blades; each of the said blades being formed with a projection located in line therewith and having a cutting-face, and with a projection located at one side thereof and having two cutting edges, and means for connecting the sleeves with the blades; substantially as described.

3. A pruning implement comprising a handle, a pair of blades connected therewith; each of the said blades being formed with an arm, with a projection located in line with the blade and having a cutting-face, and with a projection located at one side of the blade and having two cutting-faces; bars pivoted to the arms, a sleeve adapted to slide on the handle, a rod having one of its ends connected with the sleeve and its opposite end pivoted to the bars which are connected with the arms; substantially as set forth.

4. A pruning implement comprising a handle, a sleeve mounted on the handle, a rod having one of its ends connected with the sleeve, a hollow tube connected with the handle, a pair of blades pivoted to the said hollow tube; each of the said blades being formed with an arm, with a projection located in line with the blade and having a cutting-face, and with a projection located at one side of the blade and having two cutting-faces, bars pivoted to the arms, and a head mounted on the hollow tube adapted to reciprocate thereon and connected with the other end of the rod, the lower ends of the arms being pivoted to the head; substantially as set forth.

5. A pruning implement comprising a pair of blades; each of the said blades being formed with a projection located in line therewith and having a cutting-face, and with a projection located at one side thereof and having two cutting-faces, a hollow tube to which the blades are pivoted, a handle, a sleeve operating on the handle, a head adapted to slide on the tube, bars connecting the blades with the head, and a rod connecting the sleeve with the head; substantially as set forth.

6. A pruning implement comprising a hollow tube having a slot, a pair of blades pivoted in the said slot; each of the said blades being formed with a projection located in line therewith and having a cutting-face, and with a projection located at one side thereof and having two cutting-faces, and means for operating the blades; substantially as set forth.

7. In a pruning implement, the combination of a hollow tube having a slot, cutting-blades pivoted in said slot and a bushing interposed between the blades and tube whereby strength is added to said tube, substantially as set forth.

8. In a pruning implement, the combination of a hollow tube having a slot, cutting-blades pivoted therein, a bushing adjacent to said blades and on the inner side of the hollow tube, and a segmental collar reinforcing said tube on its outer side, substantially as set forth.

9. In a pruning implement, the combination of a hollow tube having a slot, cutting-blades pivoted in said slot having arms for operating said blades, and a plug situated within said tube for arresting the downward movement of said arms, substantially as set forth.

10. A pruning implement comprising a pair of blades; each of the said blades being formed with a projection located in line therewith and having a cutting-face, and with a projection located at one side thereof and having two cutting-faces; substantially as set forth.

11. A pruning implement comprising a pair of blades; each of the said blades being formed with a projection located in line therewith and having a convex cutting-face, and with a projection located at one side thereof and having two concave cutting-faces; substantially as set forth.

CHARLES W. HERWICK.
EDMOND J. LONERGAN.

Witnesses:
JAS. E. KNIGHT,
J. W. KEMP.